INVENTOR.
JOHN R. FEATHERSTON
BY
*Fraser and Bogucki*
ATTORNEYS

Feb. 28, 1967 J. R. FEATHERSTON 3,307,151

DUPLEX DATA TRANSFER OPERATIONS BETWEEN CYCLIC STORAGE DEVICES

Filed Dec. 26, 1962 2 Sheets-Sheet 2

United States Patent Office 3,307,151
Patented Feb. 28, 1967

3,307,151

DUPLEX DATA TRANSFER OPERATIONS BETWEEN CYCLIC STORAGE DEVICES

John R. Featherston, Tucson, Ariz., assignor to International Business Machines Corporation, New York, N.Y., a corporation of New York Filed Dec. 26, 1962, Ser. No. 246,951
6 Claims. (Cl. 340—172.5)

Figure 1:
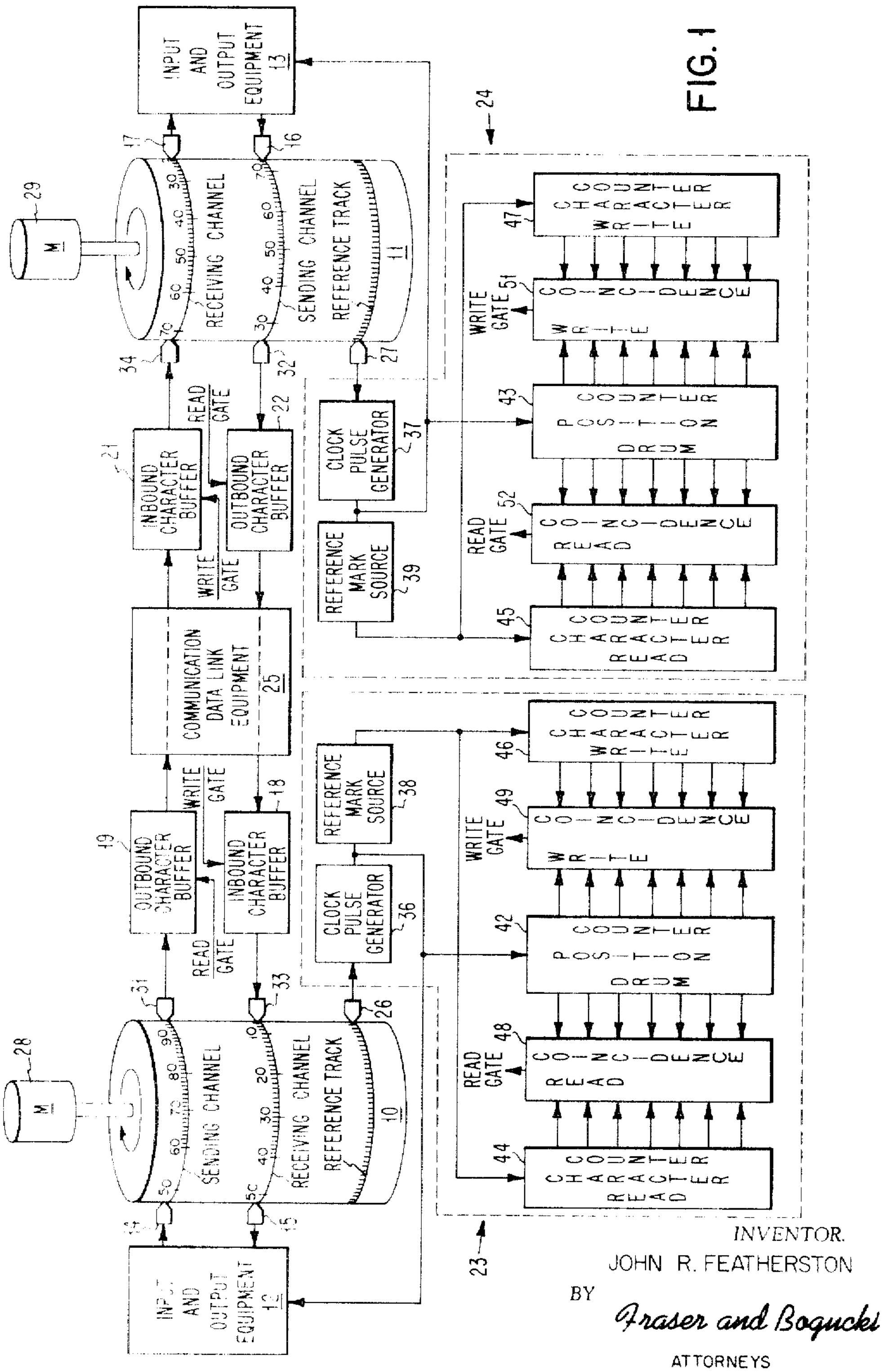

This invention relates to digital data processing systems, and more particularly to systems for transferring data between cyclic storage devices.

Cyclic recording devices, as is well known to those skilled in the data processing arts, offer certain advantages over other types of digital data storage devices. Rotating recording devices, such as drums and disks, can record and reproduce large amounts of data at high rates and with reasonably fast access times, using compact installations including relatively simple and inexpensive addressing circuitry or devices. Accordingly, drums, disks and other cyclic storage devices are used in many systems and applications where these advantages can best be realized, such as in special purpose and low cost computers, and for temporary storage and buffering applications.

One typical example of the advantageous use of cyclic recording devices is found in multistation digital data transmission systems. In such systems, message data may be transmitted intermittently between a given pair, or more, of stations, at relatively slow rates. The message data may, however, be received for transmission, as well as demanded after transmission, at much higher rates by the associated input and output equipment. Cyclic storages are ideal for such systems, because they provide adequate buffering and storage capabilities while avoiding the use of expensive station equipment. This is merely one example of the use of drum, disk, and like devices to exchange data between diffferent station points or between different parts of a given system.

The direct transfer of data between different cyclic devices is usually not feasible at present bit densities and recording rates. In order to use the full storage potential of a drum, for example, it has long been the practice to clock the bit positions with a control track, or to use an external clock source for drum speed control. Data may then be recorded and reproduced at the desired high rates. These techniques do not, however, achieve such a degree of precision that direct drum-to-drum transfer of data is practical. In essence, the problems involved in maintaining the drum positions close enough to the true time base are so extreme that to overcome them usually becomes economically unjustifiable. If data is recorded at a relatively modest 100 kilocycle per second rate, for example, an error in diplacement of a few mils would result in loss of one or more data bits, for conventional-size devices. Errors of this order of magnitude are likely to result with typical high quality drum motors from any one or more of the effects of variable friction, windage, electrical losses and line frequency. Even if lower rates are used, transient and cumulative errors are sufficient to cause loss of data or other errors which are intolerable in such systems.

The problem of synchronizing the data flow between separate cyclic storage devices has heretofore been overcome by the use of added buffer equipment in the form of random or sequential access storage devices. With standard length messages, for example, a register having an adequate capacity for the standard length message is coupled to receive output data from a drum at a sending station, and a like register is coupled to provide input data to the drum at the receiving station. The transfer of data is then effectively made from one drum to its register, from one register to the other through the data link equipment, and from the second register into its drum at the selected receiving location. Such systems become prohibitively expensive where many stations and sending and receiving channels are to be used. The systems further cannot be well adapted to handling variable length messages, such as are commonly used in data transmission systems.

There has accordingly been developed a further technique for transfer of data between separate cyclic storage devices, which technique drastically reduces the amount of buffering equipment which is needed. This technique relies on a differential between the speed of the storage devices, in that the sending device is made slower than the receiving device. If this relationship is observed, one character or data increment may be transmitted per cycle using only a one character buffer at each station. The desired speed relationship may be adequately assured by the use of different gearing ratios. This is not fully satisfactory for most applications, however, because it requires that separate devices be used for sending and receiving at each station. The extra expense of such an arrangement should be avoided if possible.

In many applications transfer of one character per storage device cycle is not only permissible but necessary in order to be compatible with data link equipment operating rates. Digital data transmission systems using narrow band techniques typically have such lower data transfer rates, for example. In these and other systems, however, it is desired to exchange messages between stations on demand, and with sending functions being separate from receiving functions. In such full duplex operation the cyclic storage devices should be asynchronous, but nevertheless capable of cooperating to effect simultaneous transfer.

It is therefore an object of the present invention to provide an improved system for transferring data between cyclic storage devices.

Another object is to provide a system for achieving full duplex operation in the transfer of data between cyclic storage devices without undue duplication of circuit elements.

Systems in accordance with the invention achieve these and other objects by providing an apparent difference in data rates for sending and receiving channels. With two cyclic storage devices having like nominal cycling speeds, the apparent data rate differences are provided by disposing successive data increment positions in opposite order relative to the cycling directions for sending and receiving channels. A one increment per cycle shift is thus introduced, and the system may be said to utilize a "drum crawl" effect.

In a specific example of such a system, provided merely as one illustration, each of a pair of drums located at different stations may be used in a full duplex operation to transfer data simultaneously between the stations. Characters in the sending channels are arranged in ascending order on the drums; characters in the receiving channels are arranged in descending order. Single character registers or buffers are coupled to receive characters from or provide characters to the individual channels. Data communication link means couple the sending channel buffers at one station to the receiving channel buffers at the other. Drum addressing means at each station are coupled to read characters from or write characters in, selected drum positions, in association with the coupled character buffers. This arrangement permits the drums to be operated at like nominal rates, with normal speed variations, but constantly maintains the apparent data rate from a sending channel slower than the rate at which data can be accepted by the coupled receiving channel. At each sending channel, data is read out in character intervals of one cycle plus one character period. The character is transferred between the successive buffers and made available to the receiving channel at any desired location in no more than a full cycle of the receiving drum. Thereafter the receiving channel can accept successive characters in intervals no greater than one cycle less a character period. Simultaneous two way transfer, or full duplex, operation thus is achieved.

Figure 2:
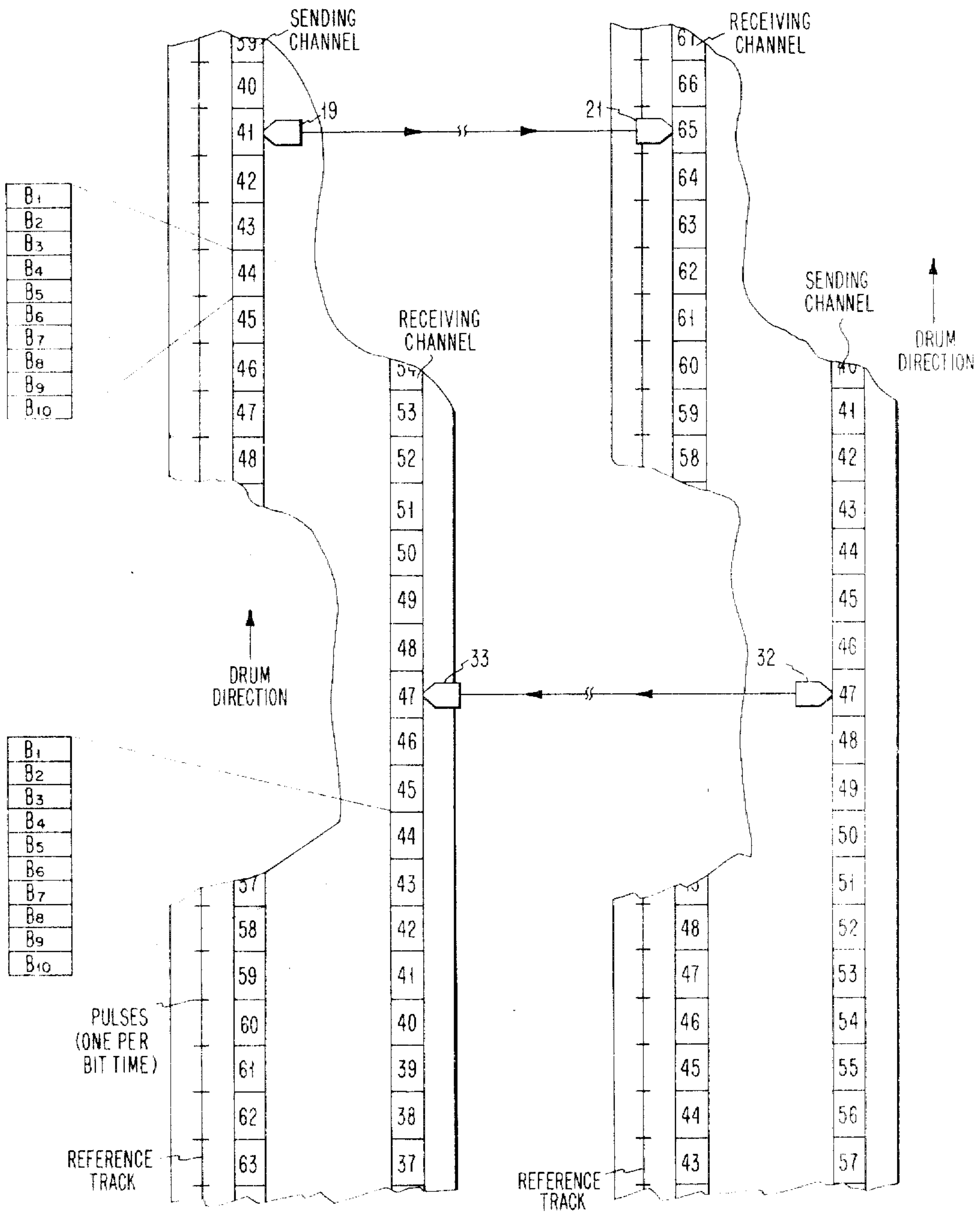

A better understanding of the invention may be had by reference to the following description, taken in conjunction with the accompanying drawings, in which:

FIG. 1 is a block diagram of an example of a system in accordance with the invention, and FIG. 2 is a simplified representation of the arrangement of data increments on the cyclic storage devices of FIG. 1.

The system of FIG. 1 illustrates the principal elements of a data transfer system as utilized in a communications system. For simplicity, the illustration is confined to two separate stations, each of which is to send and receive information in cooperation with the other station. The operative elements of principal concern to the present invention are a pair of cyclic storage devices, namely a pair of magnetic drums 10 and 11 in this example with one hundred character positions thereon. The associated input and output equipment 12 and 13 for each cyclic storage device, which may include a keyboard operating mechanism, a punch card reader, an output punch and a typewriter, or any combination of these as well as other forms of input and output equipment, has not been shown in detail, inasmuch as any suitable system may be used. The input and output equipment 12 and 13 controls or is controlled by signals stored in sending and receiving channels on the magnetic drums 10 and 11 respectively, through coupling respective input and output magnetic head pairs 14, 15 and 16, 17.

The equipment at each station additionally includes inbound and outbound character buffers 18, 19 and 21, 22, and separate control means 23 and 24 for controlling the transfer of information to or from the character buffers. These character buffers 18, 19, 21 and 22 may consist of conventional serial shift registers having a separate storage position for each character bit and responding to an external gate signal to either store or release the characters. Conventional loop delay line storage or the like may also be employed with the loop having a one character interval recirculation period. Each drum includes a reference clock track providing a positive identification of the various data increments, here termed characters, in the sending and receiving channels on the drums 10 and 11. The communication data link equipment 25 which transfers data between the two stations may be of the relatively narrow band type using telephone lines although the present example assumes radio transmission equipment. Individual lines couple the sending channel of each drum to the receiving channel of the other drum. Therefore, the characters are transmitted in the form of a sequence of pulses, and the appropriate pulses are serially recorded in the character positions on each of the drums 10 and 11. Each character may include appropriate error detecting and correcting bits, as desired.

The data may be recorded and reproduced, as appropriate, in essentially continuous message sequences by the magnetic heads 14, 15, 16, and 17 coupled to the input and output equipment 12 and 13, the transfer being controlled by conventional means under clock pulses derived by clock heads 26 and 27 respectively from the clock reference track on the drums 10 and 11. Each of the drums 10 and 11 is driven at a selected nominal rate by an associated conventional drum motor 28 or 29 which need not, however, be precisely controlled.

Characters recorded in the sending channel on each drum are reproduced by a respective magnetic head 31 (or 32) which is coupled to the respective outbound character buffer 19 (or 22) and which applies the reproduced characters to the communications data link equipment 25. Data provided from the communications data link equipment is coupled to the coupled inbound character buffer 21 (or 18) which supplies the characters in proper sequence to be recorded on the receiving channel through the connected magnetic head 34 (or 33). The outbound character buffers 19 and 22 and inbound character buffers 18 and 21 are each actuated, in full duplex operation, only once each cycle of the associated drum. The actuation of each buffer is effected by a write gate and read gate signal derived from the drum control means 23 or 24 described in more detail below. This one character per cycle transfer is compatible with the operating speed of narrow band wire or radio communications data link equipment.

Referring now to FIG. 2, which is a simplified illustrative showing of an enlarged fragmentary portion of the drum tracks, as well as FIG. 1, it may be seen that the characters in the sending channels of a drum are arranged in a sequence which provides an ascending succession of character positions on the drum track moving past the associated head, while the characters in the receiving channels provide a descending succession moving past the associated lead. Thus, when a message consisting of a sequence of characters in the sending channel of one station is to be sent to the receiving channel of the other station, the first character of the message is followed by the next character of the message at an interval of one complete cycle plus one character interval. The interval between succeeding characters is in each instance the same, thus successively shifting backward the time position of the characters in the sending channel relative to the cycling of the drum. This provides a crawl effect on the time scale, and may be termed "crawl retarding."

Conversely, the character arrangement in the receiving channels is such that the successive character positions come under the associated recording heads at times which are one character interval less than a full cycle. The crawl effect relative to the complete cycle is therefore in the opposite direction, and may be referred to as "crawl advancing." It should be noted, however, that the order of the bits $B_1$ to $B_{10}$ in each character remains alike in both sending and receiving channels, as shown in FIG. 2.

The means for controlling the operation of the outbound and inbound character buffers (18, 21 and 19, 22 respectively) operates from the reference clock track of each drum. The reference track contains a series of short duration recorded clock pulses which are spaced one bit apart. An electronic ring drives a character ring which emits a pulse for each character, as is well known in the art, to delineate the character positions on the drums. The clock pulse for each bit position is reproduced by the magnetic heads 26 and 27 respectively. An appropriately shaped control pulse is generated by a coupled clock pulse generator 36 or 37, and applied to a respective reference mark generator 38 or 39, along with a drum position counter 42 or 43, which continually is advanced in count to present the actual character position then under the magnetic head 31 or 32 on the sending track. The start or index point of a rotation cycle may be designated by a special recording pattern on the reference track, such as one which provides a higher amplitude pulse at that point, and this pulse may be identified by reference mark sources 38 and 39. Counters or separate recorded bits may also be used to identify the index point. Reference mark sources, 38 and 39, thus provide a single pulse per drum revolution to control an associated read character counter 44 or 45 and a write character counter 46 or 47, these counters being set initially with the input and output equipment to correctly designate the characters to be read from the sending and receiving channels. For example, if a message is recorded beginning with character position forty-seven in the sending channel of drum 10 for transmission, the read character counter 44 is set by the input and output equipment 12 to character position forty-seven. Upon direct comparison of the count presented by the read character counter 44 with that presented by the drum position counter 42 in a read coincidence gate 48, the read gate signal is generated at the proper forty-seventh character position time for the first cycle of the drum 10, and then at the succeeding character positions for each later cycle of the drum 10. After reading off a character, the read character counter 44 is advanced to the next higher count by the reference mark generator pulse.

Both the drum position counters 42 and 43 and read character counters 44 and 45 are conveniently supplied by conventional multistage binary (or decimal) counters arranged for a maximum count of one hundred, the drum position counters 42 and 43 being advanced one count for each reference mark by pulses from the clock pulse generators 36 and 37 and the read character counters 44 and 45 being advanced one pulse for each one hundred reference marks by the single pulse per drum rotation from the reference mark sources 38 and 39. The reference mark sources may also be a conventional counter providing an overflow pulse every one hundred counts.

The character positions in the receiving channel, however, are related to those in the sending channel in complementary fashion, and the count goes backward instead of advancing as in the sending channel during a drum rotation. To effect like addressing and sequency, the output signals representing a character position from the write character counter 46 are coupled to a write coincidence gate 49 in complementary fashion relative to the couplings of output terminals from the drum position counter 42. This may be provided by use of a conventional multistage binary (or decimal) reverse counter having a repeating count of one hundred or by any like complementary count circuit. Therefore, when the write character counter 47 on the other drum 11 is set to select the first character of a message, it may thereafter proceed to decrease one character position count per cycle in conventional fashion, with the correct character selection being made by the write coincidence gate 51 to provide the write gate signal to the inbound character buffer 21. The present example assumes 100 characters per channel, for simplicity of illustration. Although higher numbers of characters may be recorded per channel, a uniform 100 characters per channel permits ready arrangement, organization and selection of data. If a message to be transmitted is longer than 100 characters, the outbound character buffer 19 or 22 may be connected by appropriate switching circuits (not shown) to successive parallel sending channels on the drum which will provide adequate storage capacity with the single drum.

In the transfer of data between the drums 10 and 11 of the different stations, account must be taken of the different variables which make impractical, on an economic basis, the direct tying of one drum to another. In the first place, a typical system will have many different sending and receiving stations, and be required to operate so as to place incoming data in available positions in a receiving channel. If the drums 10 and 11 were synchronized by external means so as to rotate together, the position of a message in a sending channel might be such that there was no comparable receiving channel position on the other drum available to receive it. Additionally, the propagation time of data between distant points can vary widely, in both radio communication and telephonic communication systems. These variations can encompass a substantial fraction of a drum revolution at normal operating speeds and, therefore, present an additional difficulty in drum-to-drum transfer. The prior art is able to overcome these difficulties through the use of extensive buffering and speed control equipment, as well as additional control circuitry, but is not able to provide full duplex operation without multiplication of the number of drums and associated circuits which are used.

Systems in accordance with the invention, however, as illustrated by the exemplification of FIGS. 1 and 2, permit full duplex operation with both sending and receiving channels on individual drums 10 and 11 at each station. Assume that messages have been recorded by the associated input and output equipment in the sending channel of each drum, and that these messages are to be transferred to the receiving chanels of the drum at the other station. The read character counter 44 or 45 at each station is set to the start character position of the message on the associated drum, and is continually compared to the character positions presented by the drum position counter 42 or 43 in sequence as the drum 10 or 11 respectively rotates. The read character counter 44 or 45 is advanced only once per revolution, so that only one read gate signal per cycle can be presented by the read coincidence gate 42 or 43 to the outbound character buffer 19 or 22. When the first character of the message is under the associated reproducing head 31 or 32, the read coincidence gate 48 or 52 is enabled and produces a signal to store this character in the outbound character buffer 19 or 22. Then, by conventional means in the communications data link equipment 25, this character is transmitted to the connected inbound character buffer 21 or 18 respectively, without substantial delay other than normal processing and propagation times.

At the receiving channel, the inbound character buffer 21 or 18 retains the character until such time as a selected data position entered in the respective write character counter 47 or 46 is available under the associated recording magnetic head 34 or 33. The selected data position for recording, as stated previously, is complementary in value to the position registered by the drum position counter because of the complementary arrangement of the write character counters 46 and 47. Because of the "crawl retarding" effect at the sending channel, and the "crawl advancing" effect at the receiving channel, the apparent data rate of outbound characters is slower than the apparent data rate for the receiving channel. For example, when the read character counter 44 is advanced one by the reference mark generator, it causes reproduction of the next character of the message and entry of this character in the outbound character buffer 19 for transmission to the inbound character buffer 21. The second character of the message will not be provided through the communications data link equipment 25 to the inbound character buffer 21 until more than a full rotation cycle of the associated drum 11. Thus, the previous character will have been entered at its appropriate position within the full rotation cycle in adequate time for the inbound character buffer 21 to receive the next character. It should be noted in this conjunction that variations in propagation times are relatively slow varying in nature, although they may involve relatively wide amplitude swings. Accordingly, fluctuations from cycle to cycle are not sufficient to disturb these speed relationships.

The transfer of data from the sending channel of one drum to the receiving channel of another drum thus may proceed independently of minor speed variations arising because of drum motor effects. At the same time, it may be seen that the sending channels of the other drum may be concurrently used to transfer data to the oppositely disposed receiving channels, thus achieving full duplex operation.

The differential time shifts which result from concurrent use of "crawl advancing" and "crawl retarding" relationships add to provide a total differential of twice the character interval. The drum speed difference will at times be opposite, and therefore cumulative. Full duplex operation becomes feasible when it is assured that the two "crawl" effects provide a total rate that is in excess of the potential drum speed differences. Stated in another way, the total speed variation (in percent) from a selected nominal speed cannot exceed the total character shift (in percent of characters per channel) per cycle.

In practice it has been found that typical drum induction motors have total speed variations of ±0.5%. With 100 character positions per track, the total allowable speed variation is ±2%, which provides a safety margin of four times the maximum drum speed variation.

Of course, if larger safety margins are desired, the crawl effects can be increased by utilizing additional buffer equipment. For example, by the use of outbound and inbound buffers which store two characters, and by reading two characters in succession during each drum cycle from the sending channel to the receiving channel, the apparent speed differences are doubled and an even greater safety margin is achieved.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for transferring data simultaneously between a pair of cyclic storage devices at rates of essentially one data increment per cycle, comprising:

first and second cyclic storage devices each having sending and receiving channels thereon, data increment positions on the sending channels being arranged in ascending order relative to the direction of cycling, and data increment positions on the receiving channels being arranged in descending order relative to the direction of cycling, a plurality of transducer means, each operatively coupled to a different one of the channels of the storage devices, a plurality of data increment storage registers, each coupled to a different one of the transducer means, data link means individually coupling data increment storage registers associated with sending channels on the cyclic storage devices to data increment storage registers associated with the receiving channels on the other of the cyclic storage devices, and first and second cyclic storage control means each coupled to control the transfer of selected data increments between the storage devices and the individual data increment storage registers, and receiving data increments from sending channels at intervals of one complete cycle plus one data increment, and entering data increments in receiving channels at intervals of one complete cycle minus one data increment.

2. A system for providing full duplex transfer operations between a pair of cyclic storage devices comprising:

first and second cyclic storage devices each having sending and receiving channels, the sending channels having character positions arranged in ascending order relative to the direction of rotation and the receiving channels having character positions arranged in descending order relative to the direction of rotation, a plurality of character buffers, each associated with a different channel of one of the different cyclic storage devices, first and second character selecting means each operating synchronously with a different cyclic storage device for controlling the transfer of selected characters to or from the individual channels to the associated character buffers, and means coupling each character buffer associated with a sending channel of a cyclic storage device to an individual character buffer associated with a receiving channel of the other cyclic storage device.

3. In a system for providing duplex transfer operations between a plurality of like stations, the storage arrangement comprising:

cyclic storage means having sending and receiving channels, the cyclic storage means at the various stations having like nominal cycling rates means providing data character positions in the sending channels in ascending order relative to the direction of cycling, receiving means for arranging data character positions in the receiving channels in descending order relative to the direction of cycling, and transfer means synchronized with the cycling of each cyclic storage means for removing data characters from the sending channels in ascending order once each cyclic interval for transmission to the receiving channels of other stations, the rate of removal being slower than the rate at which data can be received even though the cycling rates are alike, such that duplex data transfer can take place despite cycling rate variations.

4. A cyclic storage arrangement for insuring a selected nominal difference in the data rates of each of a pair of cyclic storage devices having the same nominal speed comprising:

a sending and a receiving channel on each cyclic storage device, means providing data character positions in oppositely disposed sequences in the sending and receiving channels of each cyclic storage device, and means synchronized with the cyclic storage devices to transfer at least one successive data character once each cyclic interval from a sending channel to a connected receiving channel, the rate of removal being slower than the rate at which data can be received even though the cycling rates are alike, such that duplex data transfer can take place despite cycling rate variations.

5. An improved cyclic storage arrangement for use in duplexing operations comprising:

a cyclic storage device having a sending channel and a receiving channel, each channel having successive data character positions, reference means synchronized with the cycling of the cyclic storage device for producing a clock pulse at the beginning of each data character position in the channels, first counter means responsive to the clock pulses for maintaining a count of the number of clock pulses, output means operative responsive to a first gate signal for reading out a character from the sending channel and storing the character temporarily for transfer to the receiving channel of another cyclic storage device, receiving means operative responsive to a second gate signal for storing temporarily a character transferred thereto by the output means of a sending channel of another cyclic storage device and recording the character on the receiving channel, pulse means for producing a reference pulse once each complete cycle of the cyclic storage means, second counter means for counting the reference pulses, reverse counter means for providing a complementary count of said reference pulses, first coincidence means for comparing the count contained in the second counter with that in the first counter, and for producing the first gate signal when the two counts are equal, and second coincidence means for comparing the count in the reverse counter with that in the first counter means and providing the second gate signal when the two counts are equal, the character positions in said sending channel being in an ascending order in relation to the cycling of the cyclic storage device and the character positions in the receiving channel being in descending order relative to the direction of cycling.

6. A system for transferring data characters simultaneously between a pair of cyclic storage devices at rates of essentially one data increment per cycle comprising:

a pair of cyclic storage devices having approximately the same cyclic interval, said cyclic storage devices having sending and receiving channels, means for deriving data increments from successive positions of the sending channel in an ascending order relative to the direction of the cycling, means for disposing data increment positions in the receiving channel in a descending order relative to the direction of cycling, data characters being provided in intervals of one cycle plus one character interval, and characters transferred to a receiving channel being transferred during intervals of one cycle minus one character interval, and buffer means connected between the sending channel and one cyclic storage device and the receiving channel of the other cyclic storage device for transferring a single data increment once each cyclic interval.

References Cited by the Examiner

UNITED STATES PATENTS

| | | | |
|---|---|---|---|
| 2,925,589 | 2/1960 | Schmitt | 340—172.5 |
| 2,696,522 | 1/1961 | Crosby | 340—172.5 |

References Cited by the Applicant

UNITED STATES PATENTS

| | | |
|---|---|---|
| 3,130,387 | 4/1964 | Wright et al. |

ROBERT C. BAILEY, *Primary Examiner.*

G. SHAW, *Assistant Examiner.*